United States Patent
Huang et al.

(10) Patent No.: US 9,582,074 B2
(45) Date of Patent: Feb. 28, 2017

(54) CONTROLLING METHOD AND ELECTRONIC APPARATUS UTILIZING THE CONTROLLING METHOD

(71) Applicant: PixArt Imaging Inc., Hsin-Chu (TW)

(72) Inventors: Yu-Hao Huang, Hsin-Chu (TW); Yi-Fang Lee, Hsin-Chu (TW); Ming-Tsan Kao, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 330 days.

(21) Appl. No.: 13/910,123

(22) Filed: Jun. 5, 2013

(65) Prior Publication Data

US 2014/0164756 A1 Jun. 12, 2014

(30) Foreign Application Priority Data

Dec. 7, 2012 (TW) .............................. 101146206 A

(51) Int. Cl.
*G09G 5/00* (2006.01)
*G06F 3/033* (2013.01)
*G09G 5/08* (2006.01)
*G06F 3/01* (2006.01)

(52) U.S. Cl.
CPC .............. *G06F 3/013* (2013.01); *G06F 3/012* (2013.01)

(58) Field of Classification Search
CPC ........ G06F 3/0488; G06F 3/017; G06F 3/041; G06F 3/0412
See application file for complete search history.

(56) References Cited

U.S. PATENT DOCUMENTS

| | | | | |
|---|---|---|---|---|
| 5,367,315 A * | 11/1994 | Pan | ............................. | 345/156 |
| 7,561,143 B1 * | 7/2009 | Milekic | ......................... | 345/156 |
| 2007/0152131 A1 * | 7/2007 | Pihlaja | .................. | G06F 3/0304 250/205 |
| 2010/0053081 A1 * | 3/2010 | Jee et al. | ........................ | 345/157 |
| 2010/0182232 A1 | 7/2010 | Zamoyski | | |
| 2011/0175932 A1 * | 7/2011 | Yu | ............................. | G06F 3/048 345/661 |
| 2011/0298826 A1 * | 12/2011 | Namba | .................. | G06F 1/1616 345/635 |
| 2012/0272179 A1 * | 10/2012 | Stafford | ........................ | 715/781 |

FOREIGN PATENT DOCUMENTS

| | | |
|---|---|---|
| CN | 101379456 A | 3/2009 |
| CN | 201945946 U | 8/2011 |
| CN | 102292690 A | 12/2011 |

* cited by examiner

*Primary Examiner* — Alexander Eisen
*Assistant Examiner* — Nan-Ying Yang
(74) *Attorney, Agent, or Firm* — Winston Hsu; Scott Margo

(57) ABSTRACT

A controlling method for an electronic apparatus is disclosed. The method comprises: detecting a location for vision of an eye on a display of the electronic apparatus; controlling the electronic apparatus to operate in a first mode if a time period for the vision stops on an objective on the display is not larger than a predetermined time period; and controlling the electronic apparatus to operate in a second mode if the time period for the vision stops on an objective on the display is larger than the predetermined time period. The electronic apparatus detects at least turning operation for a head comprising the eye and performs corresponding operation according to the turning operation in the second mode.

9 Claims, 12 Drawing Sheets

Eye rolling

Head turning

CONTROLLING METHOD AND ELECTRONIC APPARATUS UTILIZING THE CONTROLLING METHOD

BACKGROUND OF THE INVENTION

1. Field of the Invention

The present invention relates to a controlling method and an electronic apparatus utilizing the controlling method, and particularly relates to a controlling method and an electronic apparatus utilizing the controlling method, which detects turning of a head to perform corresponding operation.

2. Description of the Prior Art

In the prior art, a user can utilize their vision to control an electronic apparatus. FIG. 1A and FIG. 1B are schematic diagrams illustrating a prior art operation for detecting vision to control a cursor. Please note the left eye EL and the right eye ER in the dotted frame is an enlarged figure of a figure for viewing the left eye EL and the right eye ER in an X direction vertical to the head H.

The electronic apparatus 100 includes an eye tacking apparatus 103, which can be utilized to track vision of a user. In FIG. 1A, the head H of the user is parallel with the television and does not turn. The vision locates on the cursor Cr on the display 101 of the electronic apparatus 100, and the left eye EL, the right eye ER look at the cursor Cr as shown in the drawings in the dotted frame. In FIG. 1B, the user rolls the left eye EL and the right eye ER to the right, such that the eye tacking apparatus 103 detects such operation and the electronic apparatus 100 controls the cursor Cr to have corresponding displacement on the display 101.

However, in normal life people seldom performs the operation for rolling eyes up and down, thus if a user always utilize their vision to control the electronic apparatus, they may feel inconvenient or tired.

SUMMARY OF THE INVENTION

One objective of the present invention is to provide a controlling method, which utilizes at least one head turning operation to control the electronic apparatus.

Another objective of the present invention is to provide an electronic apparatus that can be controlled by at least one turning operation of a head.

One embodiment of the present invention provides a controlling method, for an electronic apparatus. The method comprises: detecting a location for vision of an eye on a display of the electronic apparatus; controlling the electronic apparatus to operate in a first mode if a time period for the vision stops on an objective on the display is not larger than a predetermined time period; and controlling the electronic apparatus to operate in a second mode if the time period for the vision stops on an objective on the display is larger than the predetermined time period. The electronic apparatus detects at least turning operation for a head comprising the eye and performs corresponding operation according to the turning operation in the second mode.

Another embodiment of the present invention provides an electronic apparatus that can be controlled by at least one turning operation of a head, which comprises: a display; an eye-tracking apparatus, for detecting a location for vision of an eye on the display; a control unit, for controlling the electronic apparatus to operate in a first mode if a time period for the vision stops on an objective on the display is not larger than a predetermined time period, and for controlling the electronic apparatus to operate in a second mode if the time period for the vision stops on an objective on the display is larger than the predetermined time period; a head turning detecting apparatus, for detecting at least turning operation for a head comprising the eye. The control unit controls the electronic apparatus to perform corresponding operation according to the turning operation in the second mode.

In view of above-mentioned embodiments, the user can use the turning operation of the head to control the electronic apparatus, such that the problem for controlling the electronic apparatus via vision in the prior art can be avoided. Furthermore, the user can use vision to trigger head turning control, such that the user can trigger the head turning control without using their head. By this way, the convenience for the user increases.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
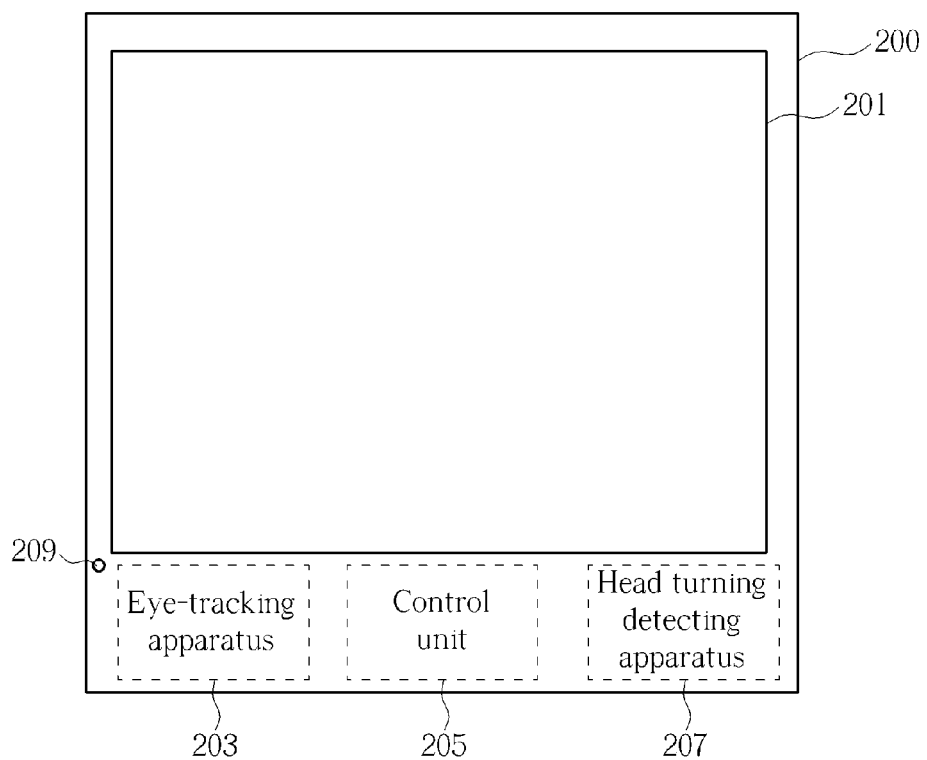
FIG. 2 is a block diagram for an electronic apparatus that utilizes head turning to control the operation thereof according to one embodiment of the present invention.

FIG. 2 is a block diagram for an electronic apparatus 200 that utilizes head turning to control the operation thereof according to one embodiment of the present invention. As shown in FIG. 2, the electronic apparatus 200 comprises a display 201, an eye-tracking apparatus 203, a control unit 205 and a head turning detecting apparatus 207. The eye-tracking apparatus 203 detects a location for vision of an eye on the display 201. The control unit 205 is arranged to control the operation of the electronic apparatus 200. The control unit 205 controls the electronic apparatus 200 to operate in a first mode if a time period for the vision stops on an objective on the display 201 is not larger than a predetermined time period. On the contrary, the control unit 205 controls the electronic apparatus 200 to operate in a second mode if the time period for the vision stops on an objective on the display 201 is larger than the predetermined time period. In one embodiment, the control unit 205 controls the electronic apparatus 200 to perform at least one operation corresponding to the vision in the first mode. The head turning detecting apparatus 207 is arranged detecting at least turning operation for a head comprising the eye. The control unit 205 controls the electronic apparatus 200 to perform corresponding operation according to the turning operation in the second mode.

Figure 3A:
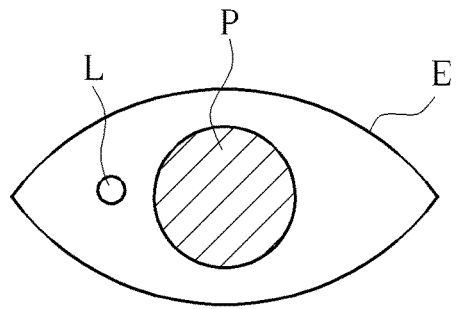
FIG. 3A, FIG. 3B and FIG. 3C illustrate an example that how the head turning detecting apparatus in FIG. 2 determines the head turning.
Figure 3B:
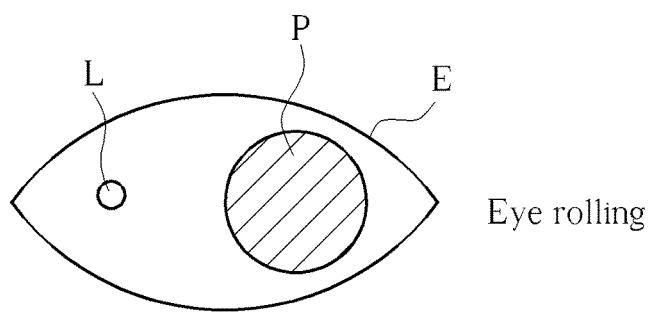
Figure 3C:
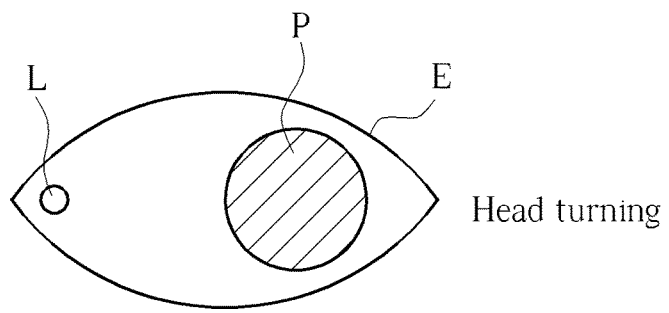

The head turning detecting apparatus 207 can be electronic apparatuses with different structures. For example, a gravity sensor or a gyroscope can be utilized to detect the turning operation of the head. Alternatively, the electronic apparatus 200 can comprise a light source 209, which can project a light point L to the eye E as shown in FIG. 3A. If it is detected that only the pupil P moves but the location for the light point L on the eye E does not move as shown in FIG. 3B, it means the eye has rolled but the head does not turn. Oppositely, if it is detected that only the pupil P moves and the location for the light point L on the eye E also moves as shown in FIG. 3C, it means the head has turned. Please note the method for detecting head turning is not limited in this example. Persons skilled in the art can understand other methods can be utilized to detect the head turning.

Please note the eye-tracking apparatus 203, the control unit 205, the head turning detecting apparatus 207 and the display 201 are provided in a single electronic apparatus 200 in the embodiment shown in FIG. 2. However, these devices can be provided on different apparatuses. For example, the head turning detecting apparatus 207 can be provided on a portable apparatus (ex. a glass or an apparatus that can be put on the head). Such kind of portable apparatus can be carried by a user, and transmits related information to the control unit 205 via wired or wireless method after determines the turning operation of the head. In such embodiment, the portable electronic apparatus and the electronic apparatus 200 can be regarded a set of electronic apparatus that utilizes the head turning to control the operation thereof. Similarly, the eye-tracking apparatus 203 can be provided to such kind of portable apparatus as well and transmits related information to the control unit 205 via wired or wireless methods after determines the vision of the eye. In such embodiment, the control unit 205 can be provided to the electronic apparatus 200 or be provided to a portable apparatus, and transmits commands to the electronic apparatus 200 via wired or wireless methods. Also, please note the tracking apparatus 203, the control unit 205 and the head turning detecting apparatus 207 are independent hard wares in the embodiment shown in FIG. 2. However, these devices can integrated to form one or more hard wares. For example, firmware can be written to the processing unit to perform function for at least one of the tracking apparatus 203, the control unit 205 and the head turning detecting apparatus 207.

Figure 1A:
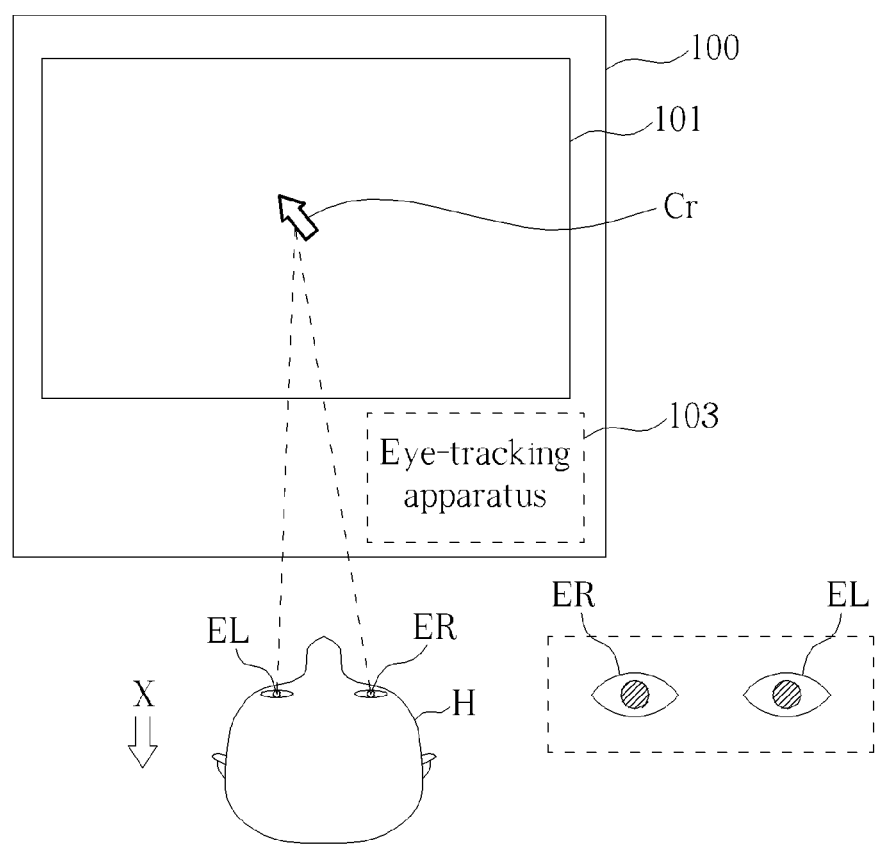
FIG. 1A and FIG. 1B are schematic diagrams illustrating a prior art operation for detecting vision to control a cursor.
Figure 1B:
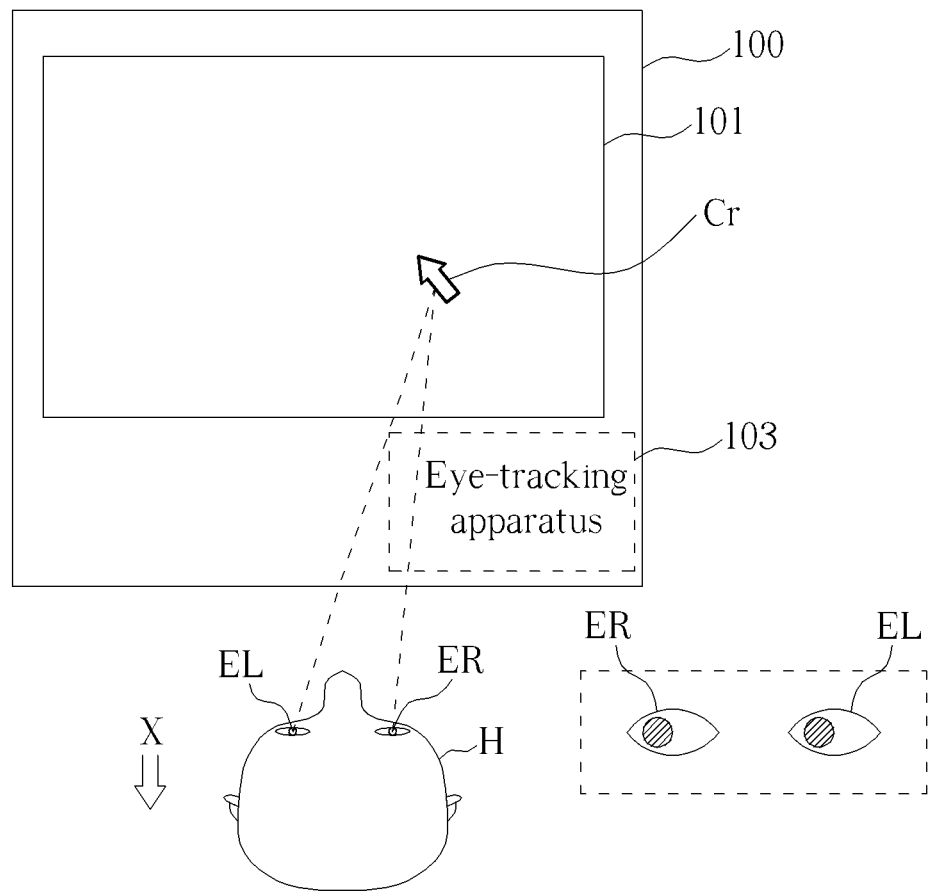
Figure 4A:
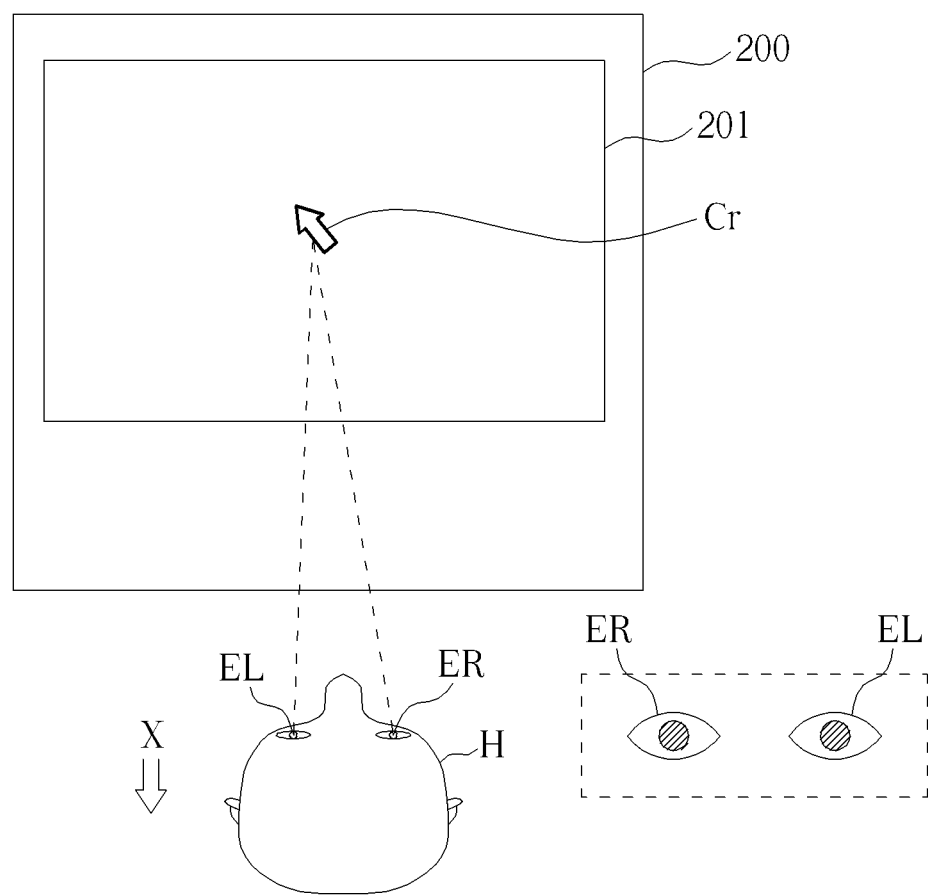
FIG. 4A and FIG. 4B are schematic diagrams illustrating how to utilize head turning to control a cursor according to one embodiment of the present invention.
Figure 4B:
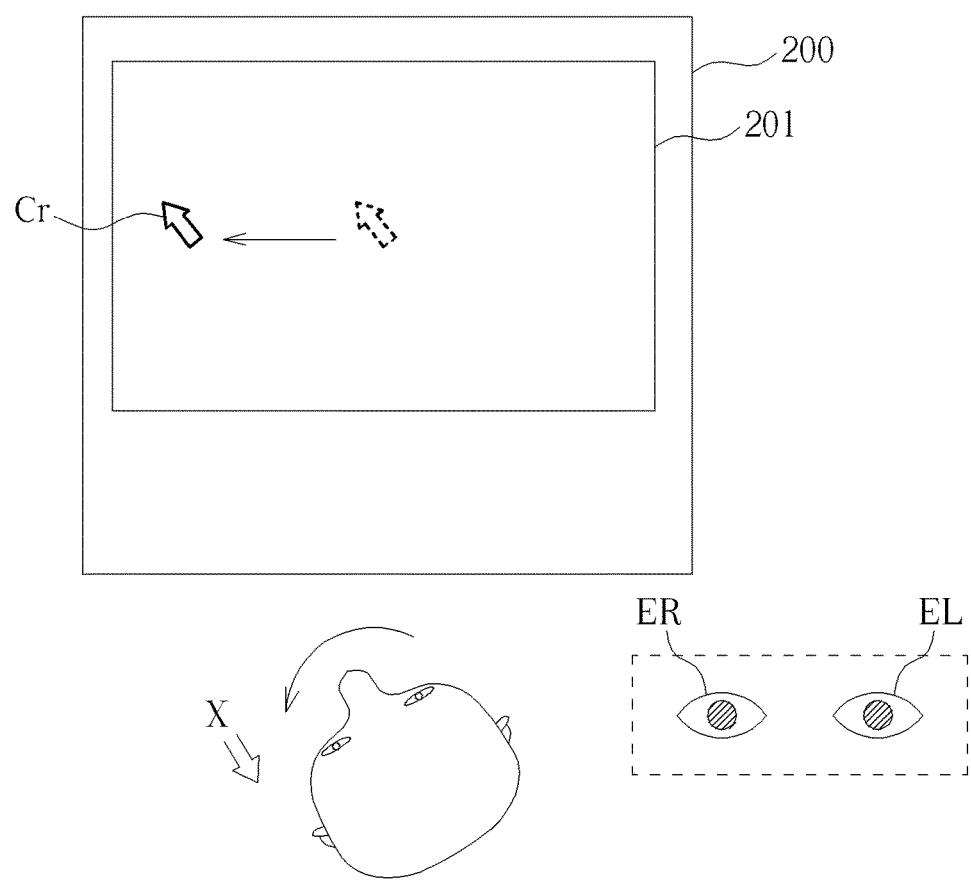

The following content will describe how to utilize the turning of the head to control the electronic apparatus 200 via figures. Please note some devices in the electronic apparatus 200 in FIG. 2 are omitted for the convenience for explaining. FIG. 4A and FIG. 4B are schematic diagrams illustrating how to utilize head turning to control a cursor according to one embodiment of the present invention. The same as FIG. 1A and FIG. 1B, the left eye EL and the right eye ER in the dotted frame is an enlarged figure of a figure for viewing the left eye EL and the right eye ER in an X direction vertical to the head H. In FIG. 4A, the electronic apparatus 200 operates in the first mode. That is, the cursor Cr on the display 201 is controlled by vision of a user, as shown in FIG. 1A and FIG. 1B. If the user wants the electronic apparatus 200 to enter the second mode, he or she must look at the cursor Cr (in such case, the cursor Cr is the above-mentioned object) for a time period larger than a predetermined time period. If the cursor Cr is looked for more than the predetermined time period, the electronic apparatus 200 enters the second mode shown in FIG. 4B.

In FIG. 4B, the head H of the user turns towards the left and the cursor Cr moves corresponding to the turning operation of the head H. In such case, the user may still look at the cursor Cr to check the movement of the cursor Cr, thus the vision for the left eye EL and the right eye ER can be the same as which in FIG. 4B. Please note the location that the vision points to does not affect the electronic apparatus 200 while it is in the second. Therefore, the user can still utilize the turning of the head H to control the movement for the cursor Cr even the user does not look at the cursor.

Figure 5A:
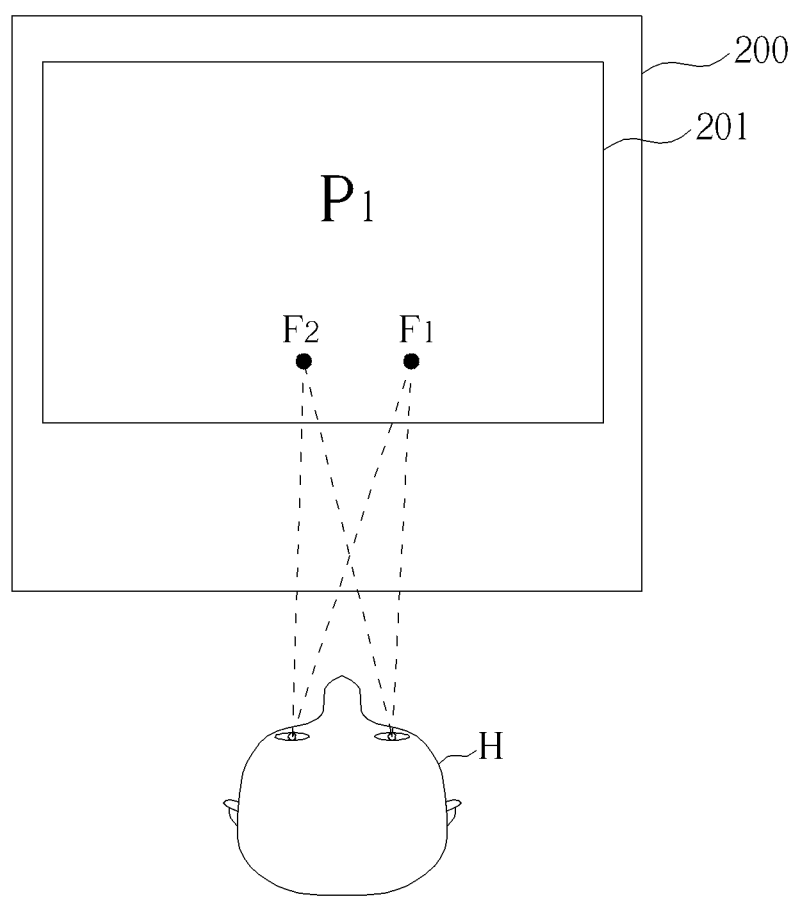
FIG. 5A, FIG. 5B and FIG. 5C are schematic diagrams illustrating how to utilize head turning to perform page flipping according to one embodiment of the present invention.
Figure 5B:
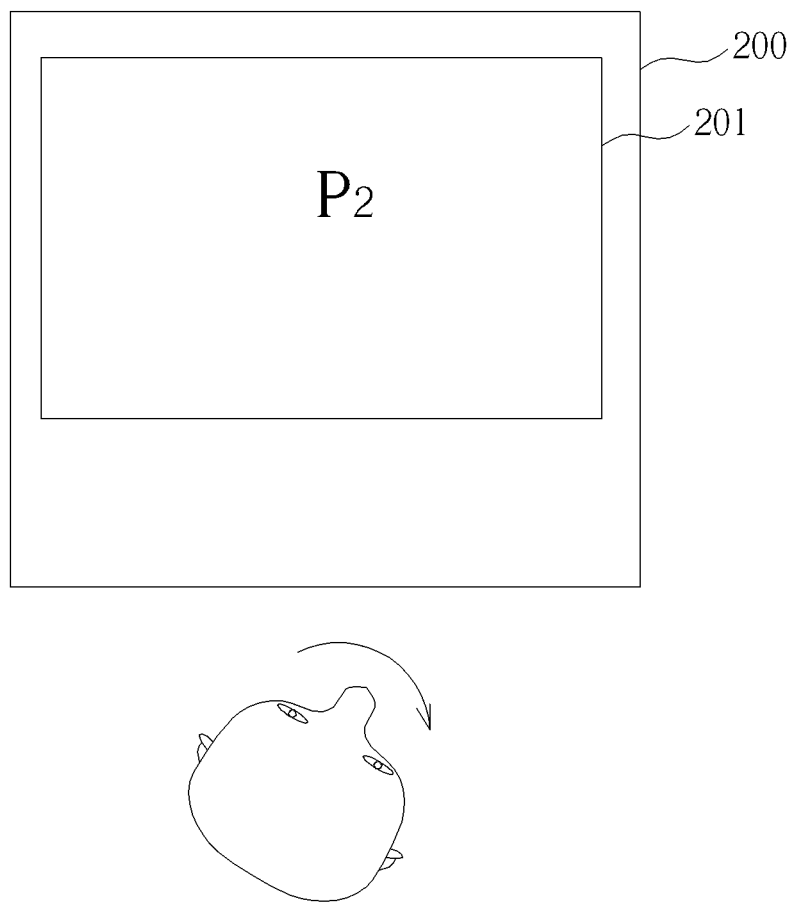
Figure 5C:
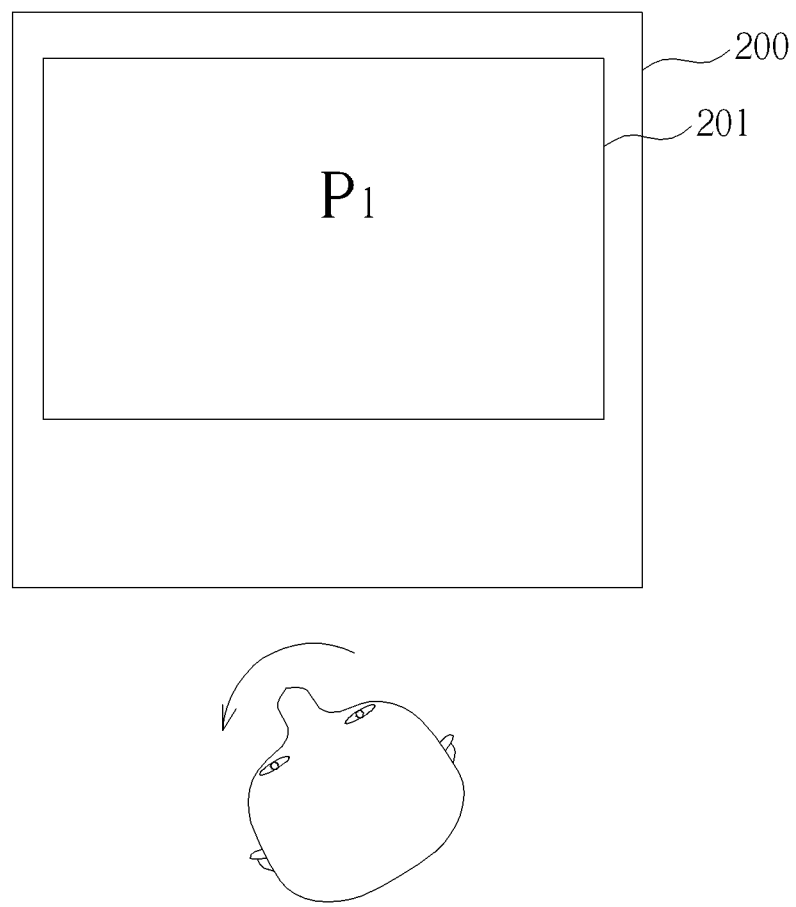

FIG. 5A, FIG. 5B and FIG. 5C are schematic diagrams illustrating how to utilize head turning to perform page flipping according to one embodiment of the present invention. In FIG. 5A, the display 201 initially displays an image $P_1$, which can be a image for a website, a picture or a document. The user can look at any point, such as the points $F_1$ or $F_2$ on the display 201 for more than a predetermined time period to control the electronic apparatus 200 to enter the second mode shown in FIG. 5B. In FIG. 5B, the head H for the user turns towards the right, such that the display 201 flips to a next image of the image $P_1$ to display an image $P_2$. If the head H turns towards the right again, the display 201 flips to a next image of the image $P_2$. If the head H turns towards the left, the display 201 flips to a previous image of the image $P_2$. That is, goes back to the image $P_1$, as shown in FIG. 5C.

Figure 6A:
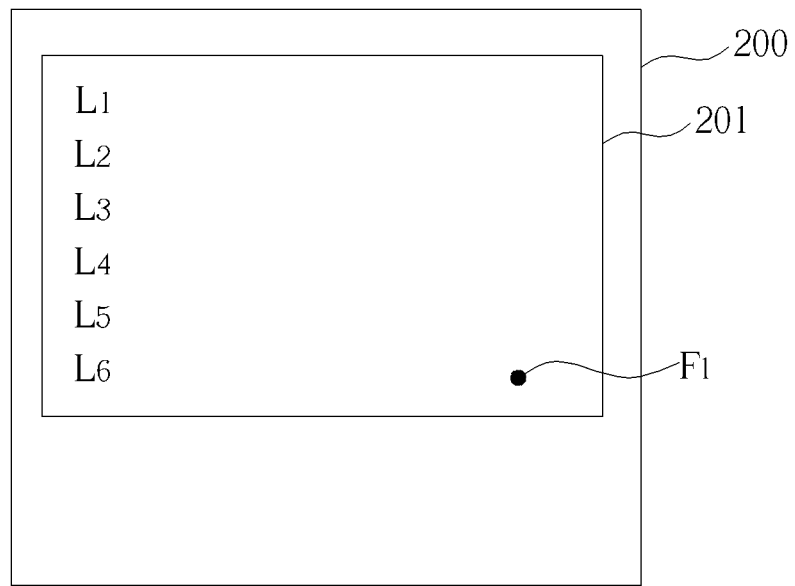
FIG. 6A and FIG. 6B are schematic diagrams illustrating how to utilize head turning to perform sliding according to one embodiment of the present invention.
Figure 6A:
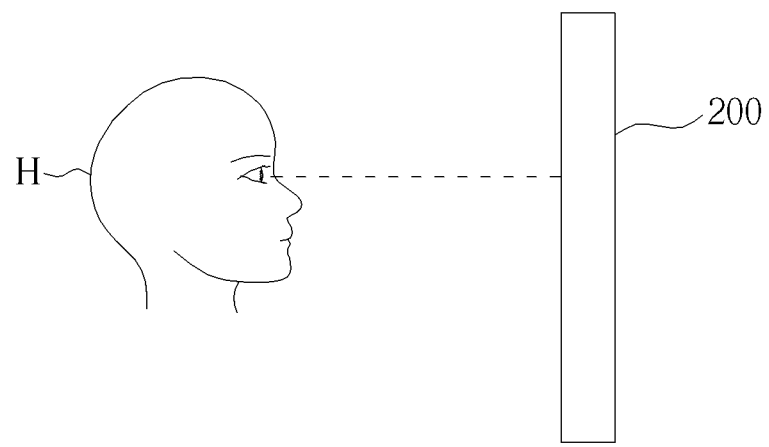
Figure 6B:
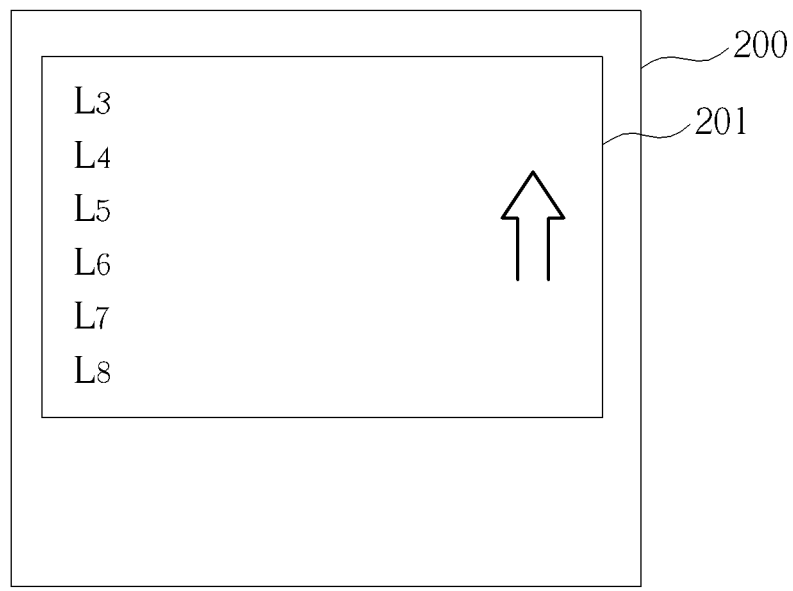
Figure 6B:
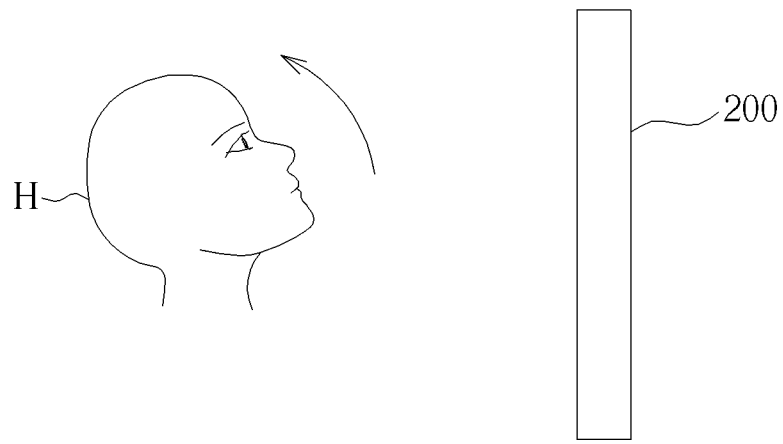

Besides turning towards the right or the left, the electronic apparatus can be controlled by turning the head upward or downward. FIG. 6A and FIG. 6B are schematic diagrams illustrating how to utilize head turning to perform sliding according to one embodiment of the present invention. In FIG. 6A, the display 201 displays a first line $L_1$ to a sixth line $L_6$ of data such as a document or website data. The user can look at any point of the display 201, such as $F_1$, for more than a predetermined time period to control the electronic apparatus 200 to enter the second mode. In FIG. 6B, the user turns his/her head upward, and the display 201 slides the data displayed thereon upward, such that the display 201 displays the third line $L_3$ to the eight line $L_8$ of the data, as shown in FIG. 6B.

In view of above-mentioned description, a user can turn his head to control the electronic apparatus to perform different functions. However, please note the relation between the above-mentioned turn direction and the function is only for example, but doe not mean to limit the scope of the present invention.

Figure 7:
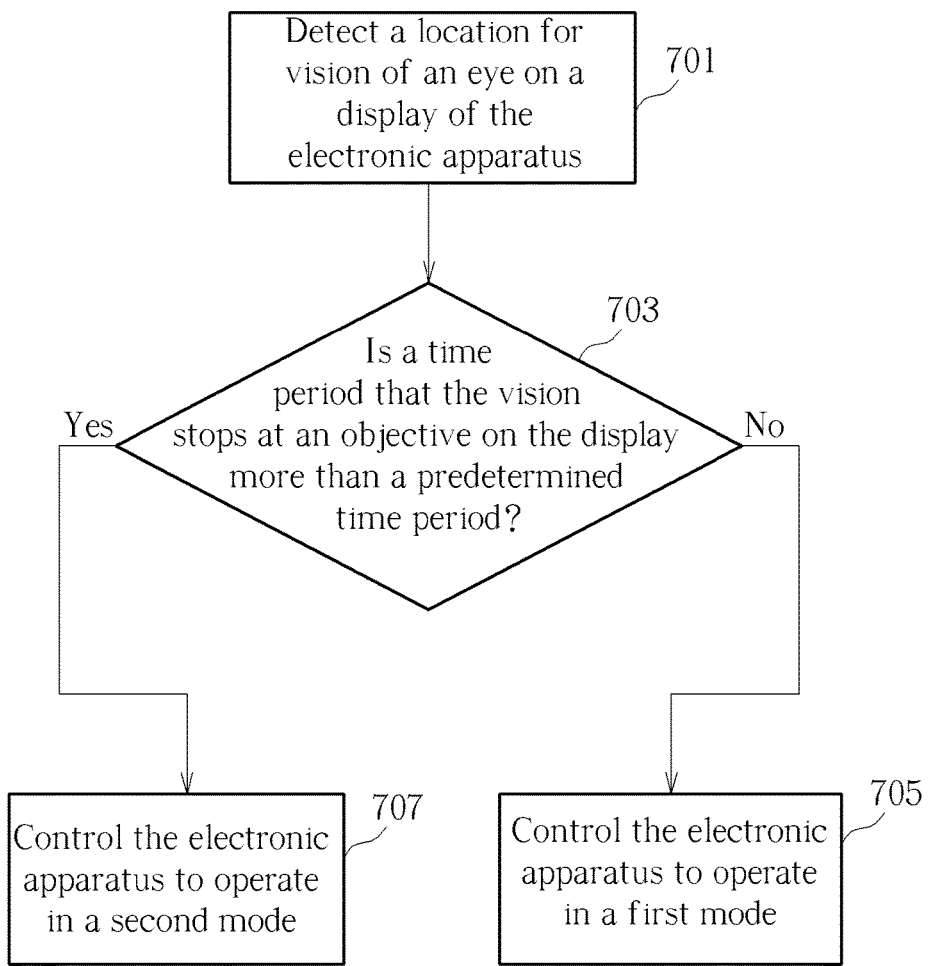
FIG. 7 is a flow chart illustrating a controlling method according to one embodiment of the present invention.

In view of above-mentioned embodiments, an electronic apparatus control method can be acquired. FIG. 7 is a flow chart illustrating a controlling method according to one embodiment of the present invention, which includes the following steps:

Step 701

Detect a location for vision of an eye on a display of the electronic apparatus.

Step 703

Determine if a time period that the vision stops at an objective on the display is more than a predetermined time period. If not, go to step 705, if yes, go to step 707.

Step 705

Control the electronic apparatus to operate in a first mode. In one embodiment, the electronic performs operations corresponding to the vision in the first mode, as shown in FIG. 1A and FIG. 1B, but it is not limited.

Step 707

Control the electronic apparatus to operate in a second mode. The electronic apparatus detects at least turning operation for a head comprising the eye and performs corresponding operation according to the turning operation in the second mode. For example, move the cursor Cr according to the turning operation of the head as shown in FIG. 4A and FIG. 4B. Or, perform page flipping according to the turning operation of the head as shown in FIG. 5B and FIG. 5C. Also, the image sliding can be performed according to the turning operation of the head as well, as shown in FIG. 6B.

In view of above-mentioned embodiments, the user can use the turning operation of the head to control the electronic apparatus, such that the problem for controlling the electronic apparatus via vision in the prior art can be avoided. Furthermore, the user can use vision to trigger head turning control, such that the user can trigger the head turning control without using their head. By this way, the convenience for the user increases.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controlling method, for controlling an electronic apparatus, comprising:
   detecting a location for vision of an eye on a display of the electronic apparatus;
   controlling the electronic apparatus to operate in a first mode if a time period for the vision stops on an objective on the display is not larger than a predetermined time period; and
   controlling the electronic apparatus to operate in a second mode if the time period for the vision stops on an objective on the display is larger than the predetermined time period;
   wherein the electronic apparatus performs at least one operation corresponding to the vision in the first mode;
   wherein the electronic apparatus detects at least turning operation for a head comprising the eye and slides data of a document or website data according to the turning operation but not according to the vision in the second mode.

2. The controlling method of claim 1, wherein the electronic apparatus moves a cursor on the display corresponding to the vision in the first mode.

3. The controlling method of claim 1, further comprising: projecting a light point to the eye, and determining the turning operation for the head according to a location relation between the light point and the eye.

4. The controlling method of claim 1, further comprising utilizing a gravity sensor or a gyroscope to detect the turning operation of the head.

5. An electronic apparatus that can be controlled by at least one turning operation of a head, comprising:
   a display;
   an eye-tracking apparatus, for detecting a location for vision of an eye on the display;
   a control unit, for controlling the electronic apparatus to operate in a first mode if a time period for the vision stops on an objective on the display is not larger than a predetermined time period, and for controlling the electronic apparatus to operate in a second mode if the time period for the vision stops on an objective on the display is larger than the predetermined time period;
   a head turning detecting apparatus, for detecting at least one turning operation of the head comprising the eyeball;
   wherein the control unit controls the electronic apparatus to perform at least one operation corresponding to the vision in the first mode;
   wherein the control unit controls the electronic apparatus to slide data of a document or website data according to the turning operation but not according to the vision in the second mode.

6. The electronic apparatus of claim 5, wherein the control unit controls the electronic apparatus to move a cursor on the display corresponding to the vision in the first mode.

7. The electronic apparatus of claim 5, further comprising:
   a light source, for projecting a light point to the eye,
   wherein the eye-tracking apparatus determines the turning operation for the head according to a location relation between the light point and the eye.

8. The electronic apparatus of claim 5, wherein the head turning detecting apparatus is a gravity sensor or a gyroscope to detect the turning operation of the head.

9. The electronic apparatus of claim 5, comprising a first electronic apparatus and a second electronic apparatus, wherein the first electronic apparatus comprises the display and the second electronic apparatus comprises the at least one of the eye-tracking apparatus, the control unit and the head turning detecting apparatus.

* * * * *